Jan. 12, 1926.  
J. A. MURPHEY  
1,569,666  
TILTABLE STEERING WHEEL  
Filed Nov. 27, 1922  2 Sheets-Sheet 1
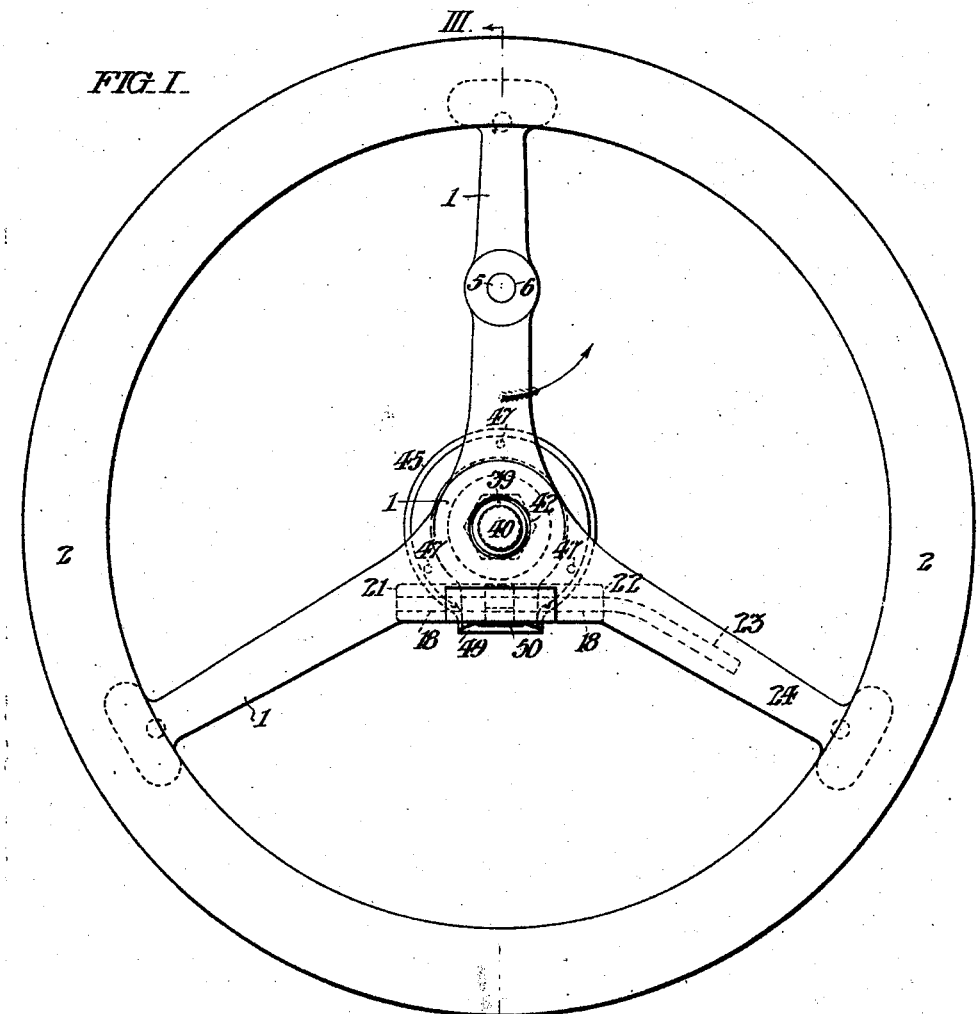
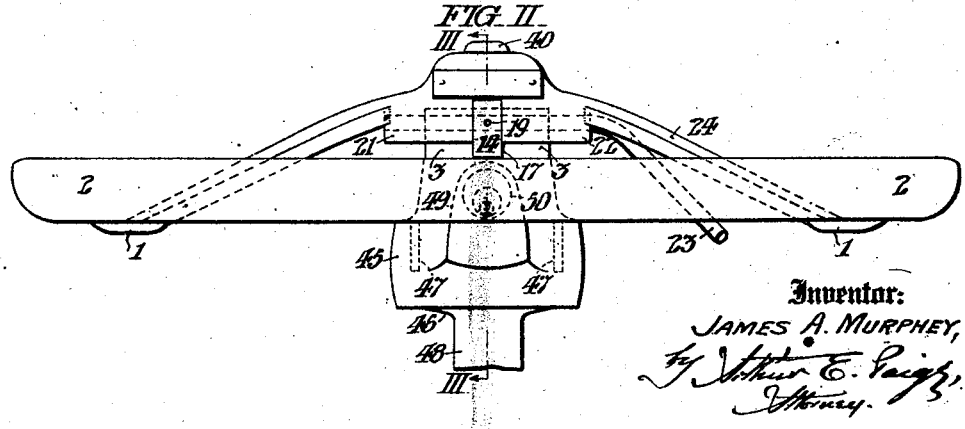
Inventor:  
JAMES A. MURPHEY, Jan. 12, 1926.  
J. A. MURPHEY  
1,569,666
TILTABLE STEERING WHEEL
Filed Nov. 27, 1922  2 Sheets-Sheet 2
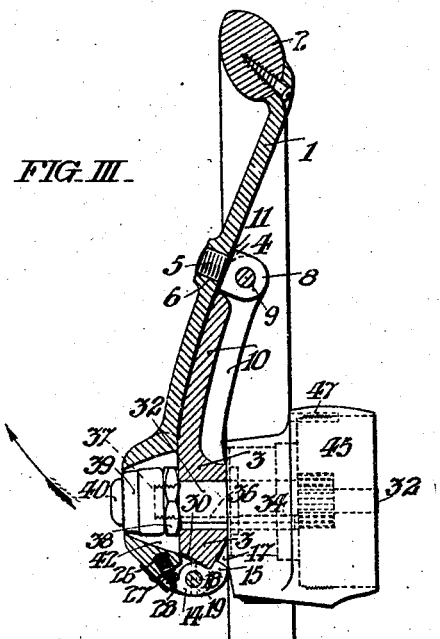
FIG. III.
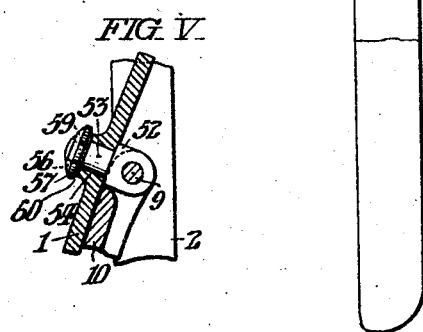
FIG. V.
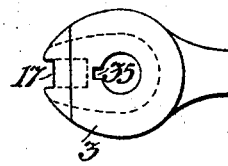
FIG. IV.
Inventor:
JAMES A. MURPHEY, Patented Jan. 12, 1926.

1,569,666

UNITED STATES PATENT OFFICE.

JAMES A. MURPHEY, OF GERMANTOWN, PENNSYLVANIA.

TILTABLE STEERING WHEEL.

Application filed November 27, 1922. Serial No. 603,459.

*To all whom it may concern:*

Be it known that I, JAMES A. MURPHEY, a citizen of the United States, residing at Germantown, in the county of Philadelphia and State of Pennsylvania, have invented a certain new and useful Improvement in Tiltable Steering Wheels, whereof the following is a specification, reference being had to the accompanying drawings.

My invention relates to an automobile steering wheel capable of being tilted upon the steering shaft upon which it is mounted, so as to facilitate the ingress and egress of the operator, with respect to the chauffeur's seat. It is characteristic of the form of my invention hereinafter described; that said wheel is hingedly connected with its hub, and the latter provided with locking means for normally detaining said wheel in operative relation with said steering shaft, but capable of being temporarily disengaged to permit the wheel to be tilted. Such locking means is conveniently in the form of a pivoted latch which is spring pressed, so that it will automatically engage the wheel in operative relation with its shaft whenever said wheel is tilted to its operative position, but such latch is provided with a handle whereby it may be manually released to permit the wheel to be tilted to idle position.

Moreover, in said form of my invention; said steering shaft is provided with locking means which, in accordance with its position, prevents or permits the wheel to be steered. The latter locking means cooperate with the tilting means above described in holding the pivotal connection in the desired angular position of rotation while the wheel is tilted; it being normally desired to retain the wheel in inoperative position between the instrument board and the steering column. The latter locking means are adapted for detachably rigidly connecting said steering shaft with the bearing tube inclosing said shaft, so as to thus prevent the vehicle from being steered; and are preferably so constructed and arranged that the front wheels of the vehicle may be turned against a curb or similar obstruction before thus locking the vehicle, to prevent the latter from being towed. Such locking means conveniently includes a lock body, preferably of a "pin" key type, which may be permanently retained in connection with the vehicle, but alternately in two positions, in both of which it is locked, but in only one of which it locks the vehicle. However, the latter construction and arrangement of locking means are the subject matter of Letters Patent of the United States 1,425,408 granted to me August 8, 1922.

I have found it convenient to illustrate my invention with reference to an embodiment thereof in conjunction with a steering shaft and its appurtenances of the present "Ford" type, and to adapt the locking means to detachably engage the cover of the internal gear case which is a stationary fixture at the top of the steering column. Such covers are screw threaded and, ordinarily, are removable at any time by merely rotating them. However, the form of my invention hereinafter described includes detent means which prevent the removal of said cover; so that said device is not only capable of preventing the vehicle from being steered, but also prevents removal of said cover.

The form of my invention hereinafter described is designed to be sold as an accessory, comprising a complete steering wheel and internal gear case cover, adapted to be substituted for the automobile steering wheel and internal gear case cover of the ordinary automobile of the "Ford" type.

However, my invention includes the various novel features of construction and arrangement hereinafter more definitely specified.

In said drawings; Fig. I is a plan view of a steering wheel, steering shaft, and their appurtenances, comprising the accessory aforesaid, embodying my improvements.

Fig. II is a front edge view of said structure.

Fig. III is a vertical sectional view of said structure, taken on the lines III, III in Figs. I and II.

Fig. IV is a detached plan view of the steering wheel hub shown in section in Fig. III.

Fig. V is a fragmentary vertical sectional view, similar to Fig. III, but showing a modified form of swivel connection.

Referring to the form of my invention shown in Figs. I to IV inclusive; the steering wheel comprises the spider frame 1 of cast metal, provided with the wooden rim 2. Said spider frame is normally rigidly connected with the hub 3, but the construction and arrangement are such that said wheel may not only be tilted, but may be swung in eccentric relation to its normal position, so as to be entirely out of the way of the operator. The means thus connecting said spider frame 1 and its hub 3, include the swivel bolt 4, having the screw threaded stud 5 which is in threaded engagement with the socket 6 in said spider, and having the eye 8 which is pivotally connected, by the pin 9, with the bearing arm 10 of said hub 3. It may be observed that said stud 5 has its axis extending obliquely transverse to the plane of the wheel, and said pin 9 has its axis eccentric and transverse to the axis of said wheel, being tangential to a circle concentric with the wheel axis and intersecting the axis of said stud 5; and that both pivots 5 and 9 extend within the axial extent of the wheel and wholly above the lower plane of the wheel. It is to be understood that said swivel connection permits the wheel to tilt upon the axis of said pin 9 and also to turn upon the axis of said stud 5; so that said wheel may be uplifted from its normal position shown in the several figures, by hinge movement with respect to the axis of said pin 9, and also turned around upon said axis of the stud 5, to enable the operator to thus easily temporarily dispose of the wheel in idle position in front of the steering column and in a plane substantially parallel with said column.

It is to be particularly noted that such movement, which is effected toward the right in Fig. I, unscrews said spider frame 1 from said screw stud 5 so that the wheel turns freely; but said swivel connection includes the spring washer 11 which encircles said stud 5 and is normally compressed between said spider frame and the shoulders 12 on said swivel bolt 4, when said wheel is returned to normal position, to thus prevent any lost motion or rattling of said parts.

However, said steering wheel is conveniently normally detained in the operative position shown, by means of the pivoted locking hook latch 14 which is carried by said spider frame 1 and has its hook end 15 normally engaged as a key in the locking recess 17 in said hub 3. Said latch 14 is rigidly connected with its shaft 18, conveniently by the tapered pin 19. Said shaft 18 is journaled in the bearings 21 and 22 in said spider frame 1 and has its righthand end portion bent to form the handle 23, which extends beneath the spoke 24 of said spider 1, as indicated, in such position that the operator may grasp said spoke and handle and thus easily press the latter upward to turn said shaft 18 to disengage said latch from said hub recess 17 and thus permit the wheel to be uplifted and turned to idle position as above described.

However, said spider frame 1 has the spring socket 26 holding the spring 27 in position to continually press upon the spring abutment 28 of said locking latch 14 so that the latter is normally held in the locked position shown in Fig. III, in which position, said spring 27 presses said spider 1 tightly upon said hub 3 and thus prevents any lost motion or rattling. Moreover, said hub is provided with the inclined face 30 which is encountered by the hook end 15 of said locking latch 14 when the operator attempts to return said steering wheel to normal position, and automatically retracts said hook latch 14, against the pressure of its spring 27 which, however, snaps said hook into the locked position shown in Fig. III, as a consequence of the downward return tilting movement of said wheel, without the special attention of the operator.

In other words; although said steering wheel, comprising the spider frame 1 and its rim 2, is thus normally held in perfectly rigid relation with its hub 3, by the means above described; it is only necessary for the operator to grasp the spider spoke 24 in such manner as to shift the handle 23, to release said wheel, so that it may be easily turned upon its swivel connection comprising said axes at right angles to each other, and thus disposed in any desired idle position, out of the way of the operator; and the easy movement of said wheel to its normal position, suffices to relock it in that position, automatically, without the special attention of the operator who is certainly appraised of the fact that the wheel is thus latched and locked by the snapping sound of said latch 14.

It is to be understood that the steering wheel and its hub and appurtenances above described may be connected to a vehicle steering shaft of any kind, without limitation to the specific construction and arrangement of the steering shaft 32 which I have chosen for illustration. However, I find it convenient to rigidly connect said wheel hub 3 with said shaft 32 by means of the key 34 which is merely a rectangular bar tightly fitted in the keyway 35 in said hub 3 and in the keyway 36 in said shaft. Said shaft 32 is provided with the screw thread 37 at its upper end for engagement with the nut 38 which retains said hub 3 upon said shaft 32. I have found it convenient to attach to said nut the casing 39 of the push button 40 which may be used to control the horn on the vehicle. Said spider is provided with the conical axial recess 42 to permit said spider to freely move to and from the position shown when turned upon its swivel connections above described.

As above noted; said shaft 32 is part of the structure specially adapted for embodiment in an ordinary automobile of the "Ford" type, and of the general construction shown in Letters Patent of the United States 1,425,408 granted to me August 8, 1922, which includes the internally screw threaded cover 45 engaging an external thread on the internal gear case 46, and interlocked therewith by the three pins 47, which extend through both threads. Said case 46 is a stationary fixture at the top of the steering column 48. Said cover 45 includes the lock casing 49 for the lock body 50, which is preferably of the pin key type and adapted to be axially reciprocated in said casing 49 to lock and unlock said steering shaft 32 with respect to said cover 45 and thus hold said shaft 32 stationary and prevent the vehicle from being steered, or release said shaft to permit it to be steered in the ordinary manner. I have not shown the details of construction or arrangement of the parts within said cover 45, because I do not desire to specifically claim them in this case.

In the modified form of my invention shown in Fig. V; the swivel bolt 52 is substituted for the bolt 4 above described. Said bolt 52 has the smoothly cylindrical stud 53 fitted in the smoothly cylindrical bearing 54 in the spider frame 55, which frame is otherwise similar to the spider frame 1 above described. Said stud 53 has the screw thread 56 for engagement with the nut 57 and is flattened upon the side remote from the operator, as indicated at 59, so as to hold the spring washer 60 from tilting when said nut is turned. I find it convenient to slightly rivet the outer end of said bolt 52 to prevent the accidental loss of said nut 57. It is to be understood that the construction and arrangement shown in Fig. V are such that the spider frame 55 and the wheel of which it is a part, otherwise constructed and arranged like the wheel shown in Figs. I, II and III, may be manipulated in substantially the manner above described, except that said spider 55 is not screwed and unscrewed with respect to its swivel connection, like the spider 1, but merely turns upon its smoothly cylindrical connection with its swivel bolt.

It is to be noted that in each form of my invention, there are three axes upon which the steering wheel may be turned, viz, first, the axis of the steering shaft 32 when the wheel is in operative position; second, the axis of the pivot pin 9; and, third, the axis of the stud 5. Moreover, that the pivotal connection between the steering wheel and its hub includes said two axes, of said stud 5 and pin 9, in relatively fixed transverse relation to each other, and that said wheel is free to turn upon both said axes simultaneously in moving to and from concentric and eccentric relation to said hub. Such freedom of movement advantageously facilitates the manipulation of the wheel as compared with devices of the prior art in which the wheel is free to turn upon but one axis at a time.

Therefore, I do not desire to limit myself to the specific details of construction and arrangement herein set forth, as it is obvious that various modifications may be made therein, without departing from the essential features of my invention, as defined in the appended claims.

I claim:

1. An automobile steering wheel having a hub; a swivel connecting said wheel and hub, arranged to permit said wheel to turn upon two axes in transverse relation to each other and both eccentric with respect to the wheel axis; and screw means whereby said swivel connection may be tightened, including a screw thread on said swivel and a screw socket on said wheel engaging the same; and a spring washer between said swivel and said wheel, arranged to prevent rattling.

2. An automobile steering wheel having a hub; a swivel connecting said wheel and hub, arranged to permit said wheel to turn upon two axes in transverse relation to each other and both eccentric with respect to the wheel axis; and screw means whereby said swivel connection may be tightened, including a screw thread on said swivel and means on said wheel engaging the same; and a spring washer between said swivel and said wheel, arranged to prevent rattling.

3. An automobile steering wheel; a steering shaft; and means connecting said wheel and shaft, arranged to permit said wheel to turn upon two axes in transverse relation to each other, from operative to inoperative position with respect to said shaft; including a screw threaded stud and a screw thread on said wheel engaging said stud; whereby said connecting means automatically tightens said wheel by the movement of the latter to operative position.

4. An automobile steering wheel; a steering shaft; and means connecting said wheel and shaft, arranged to permit said wheel to turn upon two axes in transverse relation to each other, from operative to inoperative position with respect to said shaft; including a screw threaded member whereby said connecting means automatically tightens said wheel by the movement of the latter to operative position.

5. An automobile steering wheel having a spoke with a pivot bearing therein upon an axis oblique to the axis of the wheel; a steering shaft, having a pivot bearing with its axis tangential to a circle concentric with the axis of said shaft and intersecting the axis of the pivot bearing in said wheel; and means connecting said wheel and shaft, arranged to permit said wheel to turn from operative to inoperative position with respect to said shaft; including two cylindrical pivot members in integral transverse relation with each other affording universal freedom of movement between said wheel and hub; one of said pivot members being journaled in said spoke bearing and the other of said pivot members being journaled in said shaft pivot bearing.

6. An automobile steering wheel having a spoke with a pivot bearing therein upon an axis transverse to the plane of the wheel; a steering shaft, having a pivot bearing with its axis tangential to a circle concentric with the axis of said shaft and intersecting the axis of the pivot bearing in said wheel; and means connecting said wheel and shaft, arranged to permit said wheel to turn from operative to inoperative position with respect to said shaft; including two cylindrical pivot members in integral transverse relation with each other affording universal freedom of movement between said wheel and hub; one of said pivot members being journaled in said spoke bearing and the other of said pivot members being journaled in said shaft pivot bearing.

7. The combination with an automobile steering wheel; of a swivel joint connection including two pivots in transverse relation with each other but both extending within the axial extent of the wheel and above the bottom plane thereof; one of said pivots extending in direct engagement with the wheel; whereby said wheel may be tilted from operative position to inoperative position with respect to the steering shaft.

8. The combination with an automobile steering shaft; of a hub rigidly connected with said shaft, having a locking recess and a bearing arm with a pivot bearing; a metallic steering wheel spider frame including a spoke, with a pivot bearing in said spoke, eccentric to the wheel axis; a latch on said spider, arranged to engage said hub recess; and a swivel bolt having pivot members, in transverse relation, respectively engaging the pivot bearings in said hub arm and wheel spoke; whereby said wheel spider frame may be held in operative position and be turned upon two axes in transverse relation to each other from operative to inoperative position with respect to said shaft.

9. The combination with an automobile steering shaft; of a hub rigidly connected with said shaft, having a radial locking recess upon one side of said shaft and a radial bearing arm, with a pivot bearing, upon the diametrically opposite side of said shaft; a metallic steering wheel spider frame having a central opening in coaxial relation with said shaft, and including a spoke, with a pivot bearing extending through said spoke, eccentric to the wheel axis; a spring pressed hook latch carried by said spider, arranged to detachably engage said hub recess; and a swivel bolt having cylindrical pivot members, in transverse relation, respectively engaging the pivot bearings in said hub arm and wheel spoke; whereby said wheel spider frame may be held in rigid operative relation with said shaft and be turned upon two axes in transverse relation to each other, from operative to inoperative position with respect to said shaft.

In testimony whereof, I have hereunto signed my name at Philadelphia, Pennsylvania, this twenty-eighth day of October, 1922.

JAMES A. MURPHEY.